(12) United States Patent
Langdon et al.

(10) Patent No.: US 6,285,288 B1
(45) Date of Patent: Sep. 4, 2001

(54) REMOTE AIR DETECTION

(75) Inventors: Roger M Langdon, Colchester; Philip M Watts, Chelmsford, both of (GB)

(73) Assignee: Marconi Electronic Systems Limited (GB)

( * ) Notice: Subject to any disclaimer, the term of this patent is extended or adjusted under 35 U.S.C. 154(b) by 0 days.

(21) Appl. No.: 09/271,711

(22) Filed: Mar. 18, 1999

(30) Foreign Application Priority Data

Mar. 31, 1998 (GB) .................................................. 98068760

(51) Int. Cl.$^7$ .................................................. G08B 21/00
(52) U.S. Cl. ........................ 340/603; 340/606; 340/611; 356/28.5
(58) Field of Search ..................... 340/603, 601, 340/606, 611; 356/27, 28, 28.5

(56) References Cited

U.S. PATENT DOCUMENTS

| 3,771,362 | * | 11/1973 | Roberts | 73/229 |
| 4,206,999 | * | 6/1980 | Keller | 356/28 |
| 4,735,503 | | 4/1988 | Werner et al. | |
| 5,164,784 | | 11/1992 | Waggoner | |
| 5,270,787 | * | 12/1993 | Shofner et al. | 356/238 |
| 5,317,376 | | 5/1994 | Amzajerdian et al. | |
| 5,621,392 | * | 4/1997 | Paolini et al. | 340/608 |
| 5,703,679 | | 12/1997 | Morbieu | |

FOREIGN PATENT DOCUMENTS

| 0 204 295 A2 | 12/1986 | (EP) . |
| 2 254 975 A | 10/1992 | (GB) . |

OTHER PUBLICATIONS

GEC Review, vol. 8, No. 3, 1993, pp. 147–161.

* cited by examiner

Primary Examiner—Edward Lefkowitz
(74) Attorney, Agent, or Firm—Kirschstein, et al.

(57) ABSTRACT

A transmitter (41) is arranged to produce and focus a beam (54) on a remote focal point (55). A small proportion of resultant light (58) is back-scattered from the focal point (55) by particles or aerosols in air flowing through point (55) and returns to a receiver (42) where it is collected A detector combines resultant light (58) and reference light (72), splits the resultant light (58) and reference light (72) equally between two arms and detects which arm leads the other in phase thereby indicating the flow direction of air through focal point (55).

20 Claims, 4 Drawing Sheets

REMOTE AIR DETECTION

BACKGROUND OF THE INVENTION

This invention relates to improvements in or relating to remote air detection, in particular to a remote air detector and a method of remote air detection.

The measurement of air velocity and flow direction is important when controlling the motion of an aircraft in flight. Methods currently used employ a pitot tube extending from the aircraft, which enables velocity measurement in terms of the differential pressure between air in the tube and air outside the tube. This method has the disadvantage of only being able to measure velocity close to an airframe of the aircraft where the flow direction of air may be substantially effected by the airframe and is insensitive to low velocities as the differential pressure between air inside and outside the tube is proportional to the velocity of air squared. These disadvantages are particularly acute in helicopters where the forward velocity of air can be very slow or even negative and the flow direction of air, in close proximity to the airframe, can be greatly effected by the downdraft from the engine rotor.

Additionally high performance aircraft in flight, for example supersonic aircraft, operate in unstable aerodynamic configurations and require measurement of airflow direction relative to the aircraft to enable motion to be stabilised.

From FIG. 1, it is known to provide a Doppler anemometer 10 to measure the velocity of flowing air using a laser diode 11 to produce a laser output 12 which is collimated by a collimator lens 13 into a parallel beam 14. The laser diode is orientated to produce a laser output 12 polarised in the direction of propagation of the parallel beam 14 such that the parallel beam 14 is transmitted by a polarising beam-splitter 15 to form a beam 16.

The beam 16 then passes through a quarter-wave plate 17 which converts the linearly polarised light of the beam 16 into a circularly polarised light beam 18. The light beam 18 is expanded by a telescope 19 comprising lenses 20 and 21 and then passes through a window 22 in the aircraft. The beam 18 is brought to focus on a focal point 23 at a distance from the window 22 by adjustment of lenses 20, 21.

Air flowing through the focal point 23 contains particles which may be dust volcanic ash or aerosols in the form of microscopic water droplets. Measurements performed in various parts of the world show that such particles are present everywhere in the atmosphere at a concentration sufficiently to cause a measurable amount of back-scatter from the light beam 18. Hence, a small proportion of light 24 scattered by atmospheric particles close to the focal point 23 is scattered in a direction which returns through window 22, the lenses 20, 21 of telescope 19 and quarter-wave plate 17 to form a colimated signal beam 25. When the light 24 passes through the quarter-wave plate 17 it is converted from circularly polarised light to linearly polarsed light but having a direction of polarisation perpendicular to the propagation direction of the beam 16.

The signal beam 25 is substantially reflected by polarising beam-splitter 15 and is focussed by lens 26 onto the surface of a photodetector 27.

A small proportion of beam 16 is reflected from a plane face 28 of the quarter-wave plate 17 positioned closest to lens 20 and passes back through plate 17 to form a reference beam 29. The portion of beam 16 which is reflected from the plane face 28 of the plate 17 is converted from linearly polarised light to circularly polarised light and then back to linearly polarised light but with a change in the direction of polarisation such that it is perpendicular to the direction of propagation of the reference beam 29. The reference beam 29 is reflected by beam-splitter 15 and is focussed by lens 26 onto the photodetector 27.

The orientation of the quarter-wave plate 17 is adjusted such that the reference beam 29 is accurately parallel and collinear with the signal beam 25. The reference beam 29 and the signal beam 25 form an interference pattern on the surface of the photodetector 27 and, when the plate 17 is properly adjusted, the spacing of interference fringes formed by the beams 25, 29 is substantially larger than the diameter of either beam 25, 29 so that the photodetector 27 receives a light intensity modulated at the difference frequency between the beams 25, 29 which is the Doppler frequency corresponding to the motion of particles at the focal point 23.

The photodetector 27 produces an output current 30 which is passed to a signal analyser 31 which can consist of a fast Fourier transform analyser or a pulse-pair processor that identifies the Doppler frequency which provides an indication of the corresponding air velocity at focal point 23. The air velocity may be displayed on a display 32.

However, the Doppler anemometer described with reference to FIG. 1 is unable to discriminate between positive and negative directions of air flow, which is a particular problem in helicopters able to fly backwards as well as forwards.

SUMMARY OF THE INVENTION

It is an object of the present invention to obviate or mitigate the problems associated with the prior art.

According to a first aspect of the present invention a remote air detector comprises a remote air detector, comprising a transmitter operably arranged to produce and focus a light beam on a remote focal point, a receiver operably arranged to receive resultant light from the light beam that is scattered by air at the focal point, and a detector operably connected to the receiver and arranged to determine from the resultant light the flow direction of air at the focal point. In this manner the flow direction of air can be measured at a point remote from a source of disturbance of the air. The term light refers to visual, infrared and ultra-violet.

The detector may be operably arranged to determine from the resultant light the velocity magnitude of air at the focal point.

In a first embodiment, the transmitter may comprise a quarter-wave plate operably arranged to divide reference light from the light beam. The detector may comprise a beam-splitter operably arranged to combine the resultant light and reference light. A beam-splitter may be operably arranged to divide the resultant light substantially equally between two arms, each arm operably arranged to produce a signal beam substantially orthogonal and in phase to the signal beam in the other arm. Each arm of the detector may further comprise a photodetector operably arranged to detect frequency shifts between its respective signal beam and reference beam and to produce a photocurrent indicative of frequency shifts. The photocurrent from each photodetector may be operably connected to a phasemeter which is operably arranged to indicate the flow direction of air at the focal point dependant on which arm of the detector leads the other arm in phase. The photocurrent from each photodetector may be operably connected to a combining circuit which forms a combined signal that is passed to a frequency analyser operably arranged to determine the velocity magnitude of air at the focal point.

Alternatively, the transmitter may be operably connected to a variable current supply arranged to generate a modulation signal to modulate the light beam. The variable current supply may be arranged to generate a linearly rising and linearly falling modulation signal.

In a second embodiment, the transmitter may comprise a beam-splitter operably arranged to divide reference light from the light beam and to combine the resultant light and the reference light. A photodetector may be operably arranged to detect frequency shifts between resultant light and reference light and to produce a photocurrent indicative of the frequency shifts. The photodetector may be operably connected to an inversion circuit which is operably connected to the variable current supply and arranged to receive the modulation signal, the inversion circuit may be arranged to generate a substantially equal and opposite inversion signal to the modulation signal and the inversion signal may be applied to the photodetector. The photocurrent may be passed to a frequency analyser operably arranged to produce a frequency spectrum of the photocurrent. The frequency spectrum may be passed to a processor which may be operably connected to the variable current supply and may be arranged to receive the modulation signal and the processor may be arranged to determine the flow direction of air at the focal point by separately calculating frequencies from the frequency spectrum for rising and falling portions of the modulation signal. The processor may be operably arranged to determine the velocity magnitude of air at the focal point by separately calculating frequencies from the frequency spectrum for the rising and falling portions of the modulation signal.

In a third embodiment the transmitter may comprise a beam-splitter operably arranged to divide reference light from the light beam. The reference light may be passed through an optical fibre arranged to delay the reference light by the time taken for the light beam to travel to the focal point and for the resultant light to return to the receiver. The receiver may comprise a beam-splitter operably arranged to combine the delayed reference light and resultant light. A photodetector may be operably arranged to detect frequency shifts between resultant light and reference light and to produce a photocurrent indicative of frequency shifts. The photodetector may be operably connected to an inversion circuit which may be operably connected to the variable current supply and arranged to receive the modulation signal, the inversion circuit may be arranged to generate a substantially equal and opposite inversion signal to the modulation signal and the inversion signal may be applied to the photodetector. The photocurrent may be passed to a frequency analyser operably arranged to determine the flow direction of air at the focal point.

In a fourth embodiment, the transmitter may comprise a beam-splitter operably arranged to divide reference light from the light beam. The transmitter may comprise an optical amplifier arranged to amplify the power of the light beam. The optical amplifier may be operably connected to a pulse source arranged to generate a pulse signal to switch the amplifier between amplification and non amplification states. The receiver may comprise a beam-splitter operably arranged to combine reference light and resultant light. A photodetector may be operably arranged to detect frequency shifts between resultant light and reference light and to produce a photocurrent indicative of the frequency shifts. The photocurrent may be passed to gate that is operably controlled by a delay signal generated by a delay circuit driven by the pulse signal received from the pulse source. The photocurrent may be passed to a frequency analyser operably arranged to determine the flow direction of air at the focal point when the gate is activated by the delay signal.

The transmitter and receiver may share a common telescope that comprises a pair of lenses arranged to expand and focus the light beam on a remote focal point.

A scanner may cause the light beam to move across an arc ahead of the detector. The scanner may comprise a plane mirror operably connected to an actuator that is operated by a control signal generated by a control means. The scanner may comprise a lens through which the light beam is arranged to pass, the lens being arranged to focus the light beam on the remote focal point and operably connected to an actuator that is operated by a drive signal generated by the control means.

The detector may be carried by an aircraft.

According to a second aspect of the present invention a method of remote air detection comprises a method of remote air detection, producing and focussing a light beam on a remote focal point receiving resultant light from the light beam that is scattered by air at the focal point, and determining from the resultant light the flow direction of air at the focal point.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

Figure 2:
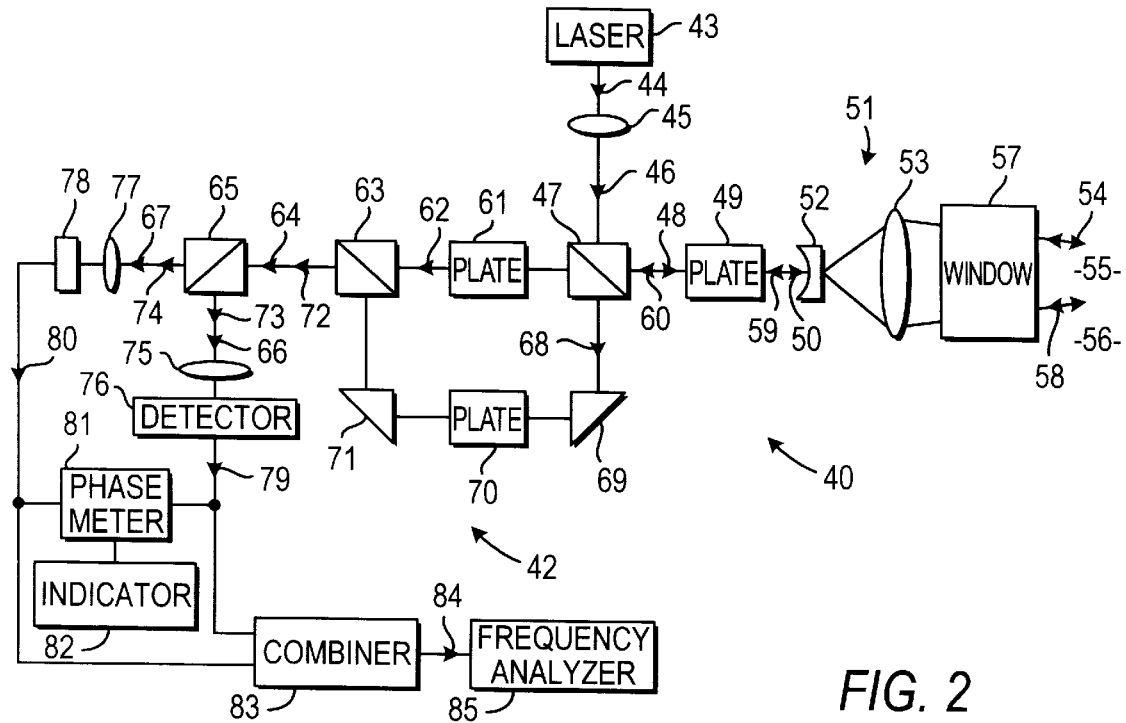
FIG. 2 is a schematic diagram of a remote air detector according to the present invention.

In FIG. 2, a remote air detector 40 comprises a transmitter 41 and a receiver 42. The transmitter 41 comprises a laser source 43 that produces an elliptical cone of laser radiation 44 which is collimated by a collimator lens 45 into a parallel beam 46. An example of a suitable laser source 43 is a single-frequency laser diode which can have a distributed feedback, single-stripe indium gallium arsenide-phosphide laser operated to have an output power level of approximately fifty milliwatts at a wavelength of approximately one thousand, five hundred and fifty nanometres. A laser source 43 of this type operating at this power level will produce laser radiation 44 having a total spectral width of approximately one megahertz and therefore have a coherence length of approximately three hundred metres, which is greater than the maximum range at which the detector 40 is to be used.

The laser source 43 is orientated in such a way that the parallel beam 46 is lineally polarised in a plane substantially perpendicular to the direction of propagation of the parallel beam 46. Most of the power in the beam 46 is reflected by a polarising beam-splitter 47 to form a reflected beam 48 which then passes through a quarter-wave plate 49 that converts the reflective beam 48 from a linearly polarised beam to a circularly polarised beam 50.

The circularly polarised beam 50 then passes through a telescope 51 comprising lenses 52 and 53 which are operably arranged to form and project an expanded light beam 54 having a diameter typically between ten and a hundred millimetres. The lenses 52, 53 are arranged to focus the expanded beam 54 on a remote focal point 55 in atmosphere 56 at a range of between one and one hundred and fifty metres from the lens 53. The light beam 54 can be arranged to pass through a plane parallel glass window 57 placed between lens 53 of the telescope 51 and the focal point 55 to allow the beam 54 to pass out of the body of an aircraft, not shown.

A small proportion of resultant light 58 is back-scattered from the focal point 55 by particles or aerosols in air flowing through point 55 in a direction which returns to the receiver 42 and further to a detector, through window 57. The light 58 is focussed by lenses 52, 53 into a substantially parallel beam 59 travelling in a direction opposite to that of the circularly polarised beam 50. The parallel beam 59 passes through the quarter-wave plate 49 where it is substantially converted from a circularly polarised beam to a linearly polarised beam 60 which passes substantially unattenuated through polarising beam-splitter 47. The linearly polarised beam 60 passes through a quarter-wave plate 61 which converts the beam 60 into a circularly polarised beam 62 that then passes through a non-polarising beam-splitter 63 that has a low reflectivity of approximately one to ten percent to form a beam 64. The beam 64 then passes through a polarising beam-splitter 65 which divides the beam 64 into two substantially equal signal beams 66 and 67. One signal beam 66 is linearly polarised and passes to a first arm and the other signal beam 67 is linearly polarised but in a direction orthogonal to that of beam 66 and passes to a second arm. Owing to the circular polarisation of beam 64, signal beams 66 and 67 are of approximately equal amplitudes but differ in phase by ninety degrees.

A small proportion of parallel beam 46, for example two percent of the power of beam 46, is transmitted through polarising beam-splitter 47 to form a beam 68. The proportion of parallel beam 46 used to form beam 68 can be adjusted by altering the orientation of the laser source 43 with respect to the polarising beam-splitter 47. Beam 68 is reflected by a prism 69, passes through a half-wave plate 70, is reflected by a prism 71 to the non-polarising beam-splitter 63 where it is reflected to form reference light 72. Light 72 is made parallel and collinear with beam 64 by adjustment of prisms 69 and 71. The half-wave plate 70 rotates the plane of polarisation of beam 68 by forty-five degrees, so that reference light 72 contains components of substantially equal intensity polarised in the same direction as signal beams 66 and 67. Light 72 passes through polarising beam-splitter 65 to form reference beams 73 and 74 having substantially equal intensity and phase.

Reference beam 73 interferes with signal beam 66 forming interference fringes which are focussed by lens 75 onto photodetector 76. Similarly, reference beam 74 interferes with signal beam 67 forming interference fringes which are focussed by lens 77 onto photodetector 78. Photodetectors 76, 78 can be indium gallium arsenide photodiodes which are sensitive to laser wavelengths in the region of one thousand five hundred and fifty nanometres. The frequencies of signal beams 66, 67 are shifted with respect to their reference beams 73, 74 by the Doppler effect caused by motion of scattering particles in the atmosphere 56 at focal point 55 such that photocurrents 79, 80 produced respectively by the photodetectors 76, 78 are modulated at the Doppler frequency. Owing to the ninety degree phase shift between signal beams 66, 67, the photocurrents 79, 80 have a phase difference of ninety degrees. The direction of circular polarisation introduced by the quarter-wave plate 61 and the direction of the forty-five degree rotated polarisation introduced by half-wave plate 70 are adjusted so that the phase of the alternating photocurrent 80 leads the phase of photocurrent 79 when the velocity of scattering particles is positive with respect to the direction of the outgoing light beam 54 and lags in phase when the velocity of scattering particles is reversed.

The direction of air flow through focal point 55 can be established by passing the photocurrents 79, 80 into a phasemeter 81 and from there to a phase indicator 82. An output from indicator 82 of plus ninety degrees indicates flow in one direction while an output of minus ninety degrees indicates flow in the opposite direction.

The magnitude of air velocity through focal point 55 can be found by adding the photocurrents 79, 80 in a combining circuit 83 to produce a combined signal 84 which is passed to a frequency analyser 85. The output from frequency analyser 85 provides a measure of the Doppler frequency and hence the air velocity.

The magnitude of signal beams 66, 67 are usually very low due to the low level of atmospheric back-scatter at a wavelength of one thousand five hundred and fifty nanometres. Long integration times are therefore required in the frequency analyser 85 to obtain an accurate measurement of air velocity. This can be remedied by raising the power of the transmitted light beam 54, for example by using a laser source 43 having an erbium-doped optical fibre amplifier or a tapered-waveguide semiconductor optical amplifier. The output from such an amplifier may need to be shaped into a circular beam suitable for coupling with the optical system described with reference to FIG. 2.

Figure 1:
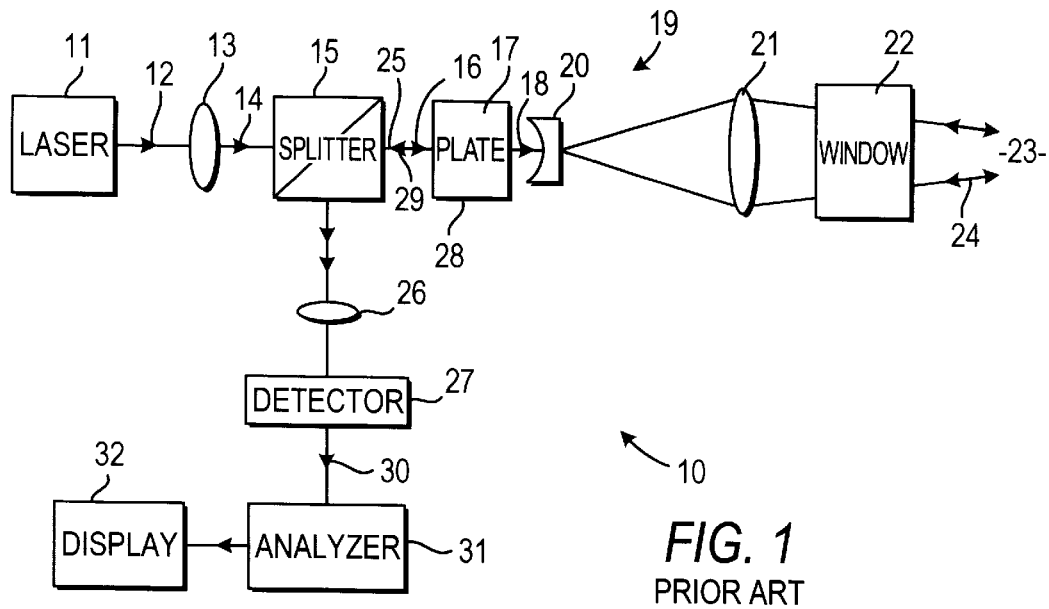
FIG. 1 is a schematic diagram of a Doppler anemometer according to the prior art.

A serious practical problem with the detector 40 described with reference to FIG. 3, and indeed described with reference to FIG. 1, is their sensitivity to solid objects in the path of the light beam 54. This is a particular problem when using the equipment in helicopters which can fly close to the ground so that the light beam 54 can intermittently intercept the ground or other solid objects such as buildings or trees. The magnitude of resultant light 58 back-scattered from solid surfaces is generally much greater than that from atmospheric back-scatter at the focal point 55, such that if a solid object is in the path of the light beam 54 the detector 40 will indicate the relative velocity of the solid object rather than the velocity of air through the focal point.

This problem can be overcome by using the following techniques. The first technique, described with reference to FIGS. 3 and 4(a) to (c), is a complete system which can determine both the velocity direction and velocity magnitude through the focal point and the second and third techniques, described with reference to FIGS. 5 and 6, demonstrate determining whether or not the output from the respective detector originates from the focal point or a solid object in a beam transmitted by the detector.

Figure 3:
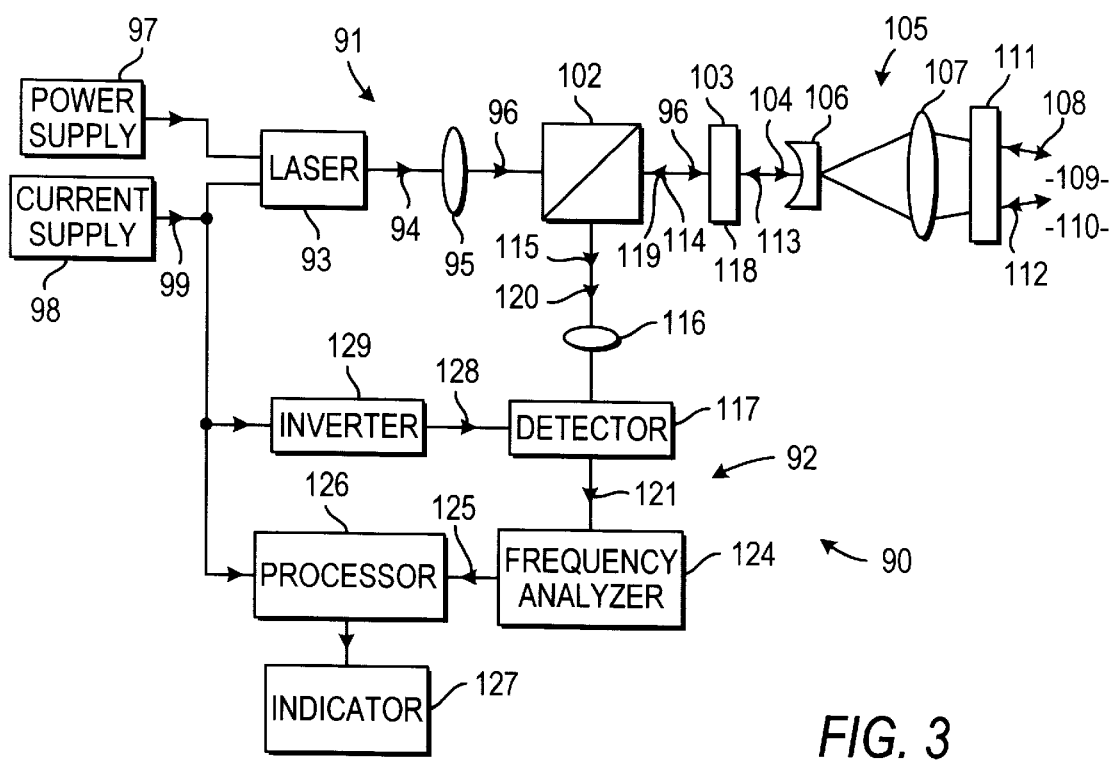
FIG. 3 is a schematic diagram of a remote air detector according to the present invention which has a decreased sensitivity to solid objects.

From FIG. 3, a remote air detector 90 comprises a transmitter 91 and a receiver 92. The transmitter 91 comprises a laser source 93 that produces an elliptical cone of laser radiation 94 which is collimated by a collimator lens 95 into a parallel beam 96. A suitable laser source 93 is a single-frequency laser diode which can have distributed feedback, single-strip indium gallium arsenide-phosphide operated to have a wavelength of approximately one thousand, five hundred and fifty nanometres. The laser source 93 is supplied by a continuous current to power supply 97 and a variable current power supply 98 generating a modulation signal 99 having a substantially triangular shape, shown as waveform 100 in FIG. 4 (a), wherein t is time along the abscissa and i is current along the ordinate. The laser radiation 94 admitted by the laser source 93 has a frequency which is modulated by the modulation signal 99 and has a time-variation as indicated by waveform 101 in FIG. 4(b). The laser radiation 94 is modulated such that the frequency increases linearly with time during the rising portion of waveform 100, FIG. 4(a), and decreases linearly with time during the falling portion of waveform 100. The shape of the modulation signal 99 is chosen so that the frequency of laser radiation 94 changes with time in a precise linear manner.

The parallel beam 96 passes substantially unattenuated through a beam-splitter 102 as the laser source 93 is orientated in such a way as to ensure that the parallel beam 96 is polarised in the direction needed to achieve. The beam 96 then passes through a quarter-wave plate 103 which converts beam 96 from a linearly polarised beam into a circularly polarised beam 104. The circularly polarised beam 104 then passes through a telescope 105 comprising lenses 106 and 107 which are operably arranged to form and project an expanded light beam 108. The lenses 106, 107 are arranged to focus the light beam 108 on a remote focal point 109 in atmosphere 110 at a range of between one and a hundred and fifty metres from the lens 107. The light beam 108 can be arranged to pass through a plane parallel glass window 111 placed between lens 107 of the telescope 105 and the focal point 109 to allow the beam 108 to pass out of the body of an aircraft, not shown.

A small portion of resultant light 112 is back-scattered from the focal point 109 by particles or aerosols in air flowing through point 109 in a direction which returns to the receiver 92 and onto a detector, through window 111. The resultant light 112 is focussed by lenses 106, 107 into a substantially parallel beam 113 travelling in a direction opposite to that of the circular polarised beam 104. The parallel beam 113 passes through the quarter-wave plate 103 where it is substantially converted from a circularly polarised beam to a linearly polarised beam 114 having a direction of polarisation substantially perpendicular to the direction of polarisation of beam 96. The beam 114 is then reflected by polarising beam-splitter 102 to form signal beam 115 which is focussed by lens 116 onto a photodetector 117.

A small proportion of beam 96 is reflected from a plane face 118 of the quarter-wave plate 103 positioned closest to lens 106 and passes back through plate 103 to form reference light 119 and is reflected by beam-splitter 102 to form reference beam 120. The portion of beam 96 which is reflected from the plane face 118 of the plate 103 is converted from linearly polarised light to circularly polarised light and then back to linearly polarised light but with a change in the direction of polarisation such that it is substantially perpendicular to the direction of propagation of reference light 119. The reference beam 120 is arranged to be collinear and parallel with signal beam 115 and is focussed by lens 116 onto photodetector 117.

Optical interference between signal beam 115 and reference beam 120 generates an alternating photocurrent 121 in the photodetector 117 at the Doppler frequency created by motion of scattering particles passing through the focal point 109. The total optical path length for the reference beam 120 between laser source 93 and the photodetector 117 is typically two hundred to three hundred millimetres whereas the total optical path length for the signal beam 115 between laser source 93 and the photodetector 117 is approximately twice the distance from lens 107 to the focal point 109 which can typically be between two and three hundred metres. Signal beam 115 is therefore delayed with respect to reference beam 120 by a time approximately equal to twice the range from lens 107 to the focal point 109 divided by the velocity of light. This time is typically in the range of seven nanoseconds to one microsecond. The frequencies of reference beam 120 and signal beam 115 are represented by waveforms 122 and 123 respectively, as shown in FIG. 4 (c).

Figure 4A:
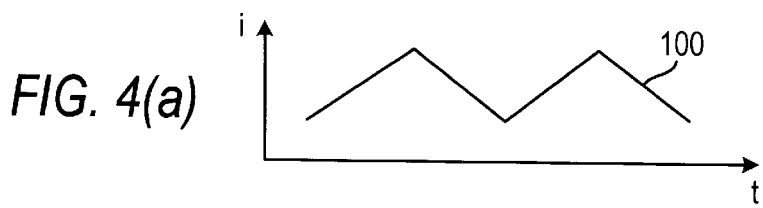
FIG. 4(a) to (c) illustrates the waveforms associated with the remote air detector described with reference to FIG. 3.
Figure 4B:
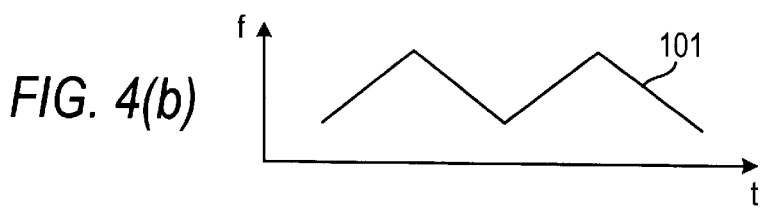
Figure 4C:
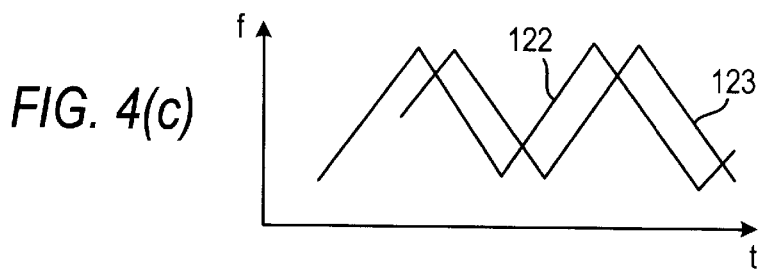
Figure 5:
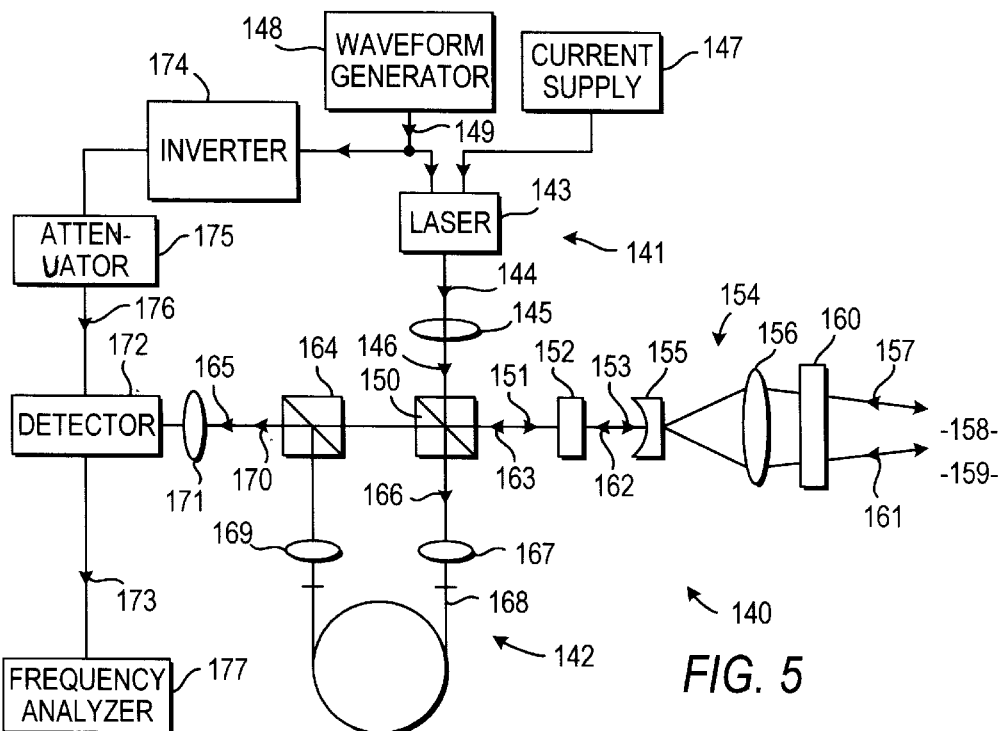
FIG. 5 shows an alternative remote air detector having a decreased sensitivity to solid objects.

From FIG. 4(c) it can be seen the waveform 123, which represents the time variation of frequency for signal beam 115, is substantially the same as waveform 122, which represents the time variation of frequency for reference beam 120, except that waveform 123 is delayed with respect to waveform 122 by an amount proportional to the range of the focal point 109 from the detector 90. The photocurrent 121 produced in photodetector 117 is therefore dependent, in part, on the range to the focal point 109 and in part on the Doppler frequency caused by motion of scattering particles through the focal point 109.

Additional frequencies are also present in the photocurrent 121 which are caused by intensity variations in the laser radiation 94 due to the periodically varying modulation signal 99 applied to laser source 93. The approximately triangular modulation signal 99 has a fundamental frequency typically in the range one to ten kilohertz, but since it has a non-sinusoidal shape it has harmonics up to frequencies of several megahertz. The harmonics can have similar frequencies to those generated by Doppler frequencies due to motion of scattering particles. Frequencies corresponding to the modulation signal 99 are unwanted as they can mask Doppler frequencies and can be removed by applying an equal and opposite inversion signal 128 to that generated by modulation signal 99 to the photodetector 117. This can be achieved by passing modulation 99 through an inversion circuit 129 which has adjustable gain. The gain of circuit 129 is adjusted such that the inversion signal 128 is equal and opposite to that portion of the photocurrent 121 corresponding to the modulation signal 99 applied to laser source 93. Therefore, substantially no signal is produced in photocurrent 121 at the frequency of modulation signal 99 and harmonics thereof.

If the frequency rate change for laser source 93 is defined as K hertz per second, the range to the focal point 109 is defined as R metres and the component of velocity of air parallel to the light beam 108 is V metres per second the frequency $f_+$ produced at the photodetector 117 during the up-going portion of the modulation signal 99 will be:

$$f_+ = 2/c(KR+Vf) \qquad \text{Equation 1}$$

where c is the velocity of light and $f$ is the mean frequency of laser source 93. The frequency $f_-$ produced at the photodetector 117 during the down-going portion of modulation signal 99 will be:

$$f_- = 2/c(KR-Vf) \qquad \text{Equation 2}$$

The air velocity V can therefore be obtained from the following calculation:

$$V = \frac{c(f_+ - f_-)}{4f}$$ Equation 3 and the range R to the focal point 109 can be calculated from:

$$R = \frac{c(f_+ + f_-)}{4K}$$ Equation 4

In order to calculate V and R the photocurrent 121 is passed to a frequency analyser 124 where the frequency spectrum 125 of the photocurrent 121 is produced. The frequency spectrum 125 is passed to a processor 126 which is also connected to the variable current supply 98 and receives modulation signal 99. The processor 126 calculates signal frequencies produced during the rising and falling portions of modulation signal 99 separately in response to the modulation signal 99 received from the variable current power supply 98. The processor 126 then calculates velocity V and range R in accordance with Equations 3 and 4 respectively and can display the results on an indicator 127.

If a solid object, not shown, appears in the path of light beam 108 at a range R substantially beyond focal region 109, a pair of frequencies $f_{1+}$ and $f_{1-}$ corresponding to resultant light 112 from the focal region 109 and another pair of frequencies $f_{2+}$ and $f_{2-}$ arising from the presence of the solid object appear in the photocurrent 121. The processor 126 calculates velocity V and range R in accordance with Equations 3 and 4 respectively for each pair of frequencies. The presence of a solid object in the light beam 108 can be recognised if its calculated range R is substantially different to the known range to the focal point 109. If the calculated range R for a pair of frequencies is substantially different from the known range R to the focal point 109 the velocity V for that pair of frequencies can be discarded, even though their magnitude can be much greater than the magnitude of a pair of frequencies for resultant light 112 from the focal point 109.

An additional useful feature of the information available at processor 126 arises from the fact frequency $f_+$ is greater than $f_-$ if the air velocity V is positive and $f_+$ is less than $f_-$ if velocity V is negative. Comparison between frequency $f_+$ and $f_-$ at processor 126 establishes the direction of air flow relative to the direction of light beam 108.

An additional feature of the equipment described with reference to FIG. 3 arises from its ability to determine the range R of solid objects in the light beam 108. If an optical scanner, described below with reference to FIG. 7, such as a tiling mirror is placed in the out-going light beam 108 as it emerges from lens 107 the space ahead of an aircraft such as a helicopter can be scanned continuously as the aircraft moves ahead. Any solid object in the path of the light beam 108 produces an output from processor 126 indicating its range R and velocity V. Thereby dangerous obstacles such as overhead wires or poles can be detected as they appear in front of the aircraft. This can be particularly important for low flying helicopters as it can provide information for a pilot to take action to avoid obstacles appearing in the flight path of the aircraft.

The sensitivity of the detector 90 can be enhanced by raising the power of the transmitted light beam 108, for example using a laser source 93 having an erbium-doped optical fibre amplifier or a tapered-waveguide semiconductor optical amplifier. The output from such an amplifier may need to be shaped into a circular beam suitable for coupling with the optical system described with reference to FIG. 3.

FIG. 4 illustrates a second technique for discriminating between an air back-scattered resultant signal and an unwanted signal from distant object which uses a detector 140 comprising a transmitter 141 and a receiver 142. The transmitter 141 comprises a laser source 143 that produces an elliptical cone of laser radiation 144 which is collimated by a collimator lens 145 into a parallel beam 146.

The laser source 143 is supplied by a constant current power supply 147 and a waveform generator 148 arranged to generate a modulation signal 149. The modulation signal 149 can be in the form of a sine wave, a broadband noise signal or a pseudo-random code. The modulation signal 149 when applied to the laser source 143 generates laser radiation 144 having a frequency spectrum with a spectral spread controllable by the nature and amplitude of the waveform 149.

The direction of polarisation of parallel beam 146 is arranged such that beam 146 is substantially all reflected by polarising beam-splitter 150 to form reflected beam 151. The reflective beam 151 passes through a quarter-wave plate 152 which converts the linearly polarised reflected beam 151 into a circularly polarised beam 153. The circularly polarised beam 153 is expanded by a telescope 154 comprising lenses 155 and 156 to form an expanded light beam 157, typically having a diameter of ten to one hundred millimetres. Lenses 155, 156 are arranged to focus the light beam 157 on a remote focal point 158 in the atmosphere 159 at a range of between one and one hundred and fifty metres from the lens 156. The light beam 157 can be arranged to pass through a plane parallel glass window 160 placed between lens 156 of the telescope 154 and the focal point 158 to allow the beam 157 to pass out of the body of an aircraft, not shown.

A small portion of resultant light 161 is back-scattered from the focal point 158 by particles or aerosols in air flowing through 158 in a direction which returns to the receiver 142 and onto a detector, through window 160. The light 161 is focussed by lenses 155, 156 into a substantially parallel beam 162 travelling in a direction opposite to that of the circularly polarised beam 153. The parallel beam 162 passes through the quarter-wave plate 152 where it is substantially converted from a circularly polarised beam to a linearly polarised beam 163 which has a direction of polarisation in the propagation direction of the beam 163. The beam 163 passes substantially unattenuated through polarising beam-splitter 150 and through a non polarising beam-splitter 164 to form signal beam 165.

A small proportion of parallel beam 146, for example two percent of the power of parallel beam 146, is transmitted through polarising beam-splitter 150 to form a beam 166 which is focussed by lens 167 into one end of a single mode polarisation maintaining optical fibre 168. The output from optical fibre 168 is collimated by lens 169 and is reflected by non-polarising beam-splitter 164 to form a reference beam 170.

Signal beam 165 and reference beam 170 are focussed by lens 171 onto the surface of a photodetector 172. The position and orientation of the output end of optical fibre 168 is adjusted so that signal beam 165 and reference beam 170 are accurately parallel and collinear. Consequently, a light intensity is focussed on the photodetector 170 which is modulated at the difference frequency between signal beam 165 and reference beam 170. The output end of optical fibre 168 is orientated such that the reference beam 170 is polarised in the same direction as signal 165 thereby a maximum photocurrent 173 is produced by the photodetector 172 at the difference frequency between signal beam 165 and reference beam 170.

The length of optical fibre 168 is adjusted so that the total optical path length travelled by reference beam 170 passing from laser source 143 through optical fibre 168 and to the photodetector 170 is similar to the optical path length travelled by the signal beam 165 from laser source 143 to the focal point 158 and back to the photodetector 172.

Owing to the short coherence length of laser radiation 144, artificially introduced by modulation signal 149, only resultant light 161 from particles close to the focal point 158 produce a photocurrent 173 of significant amplitude.

Light scattered by solid objects in the path of light beam 157 at ranges substantially removed from the focal point 158 produce no photocurrent 173 in the photodetector 172 as the reference beam 170 and the signal beam 165 are highly incoherent for objects at such ranges.

The modulation of laser radiation 144 introduced by application of modulation signal 149 produces some modulation of the intensity of reference beam 170 and hence modulation of the photocurrent 173 produced by the photodetector 172. This modulation is in addition to modulation produced by interference between reference beam 170 and signal beam 165. The modulation of reference beam 170 constitutes an unwanted background signal which, if sufficiently large, masks the signal beam 165 produced by atmospheric back-scatter. This unwanted signal can be removed, either wholly or partly, by passing the modulation signal 149 through an inversion circuit comprising an inverter 174 and an attenuator 175 to form an inversion signal 176 which is applied to an electrical input of photodetector 172. By adjustment of the attenuator 175 the inverted current 176 is arranged to be equal and opposite to the photocurrent 173 produced by the modulation of reference beam 170. The unwanted modulation of photocurrent 173 is thereby removed and the weaker atmospheric backscatter signal beam 165 can be detected.

The photocurrent 173 is passed to a frequency analyser 177 which identifies the Doppler frequency and hence the air flow velocity through the focal point 158. The Doppler frequency can be displayed on an indicator 178 which is calibrated in terms of air velocity.

The sensitivity of the detector 140 can be enhanced by raising the power of transmitted expanded beam 175, for example by using a laser source having an erbium-doped optical fibre amplifier or a tapered-waveguide semiconductor optical amplifier. The output from such an amplifier may need to be shaped into a circular beam suitable for coupling with the optical system described with reference to FIG. 5.

Figure 6:
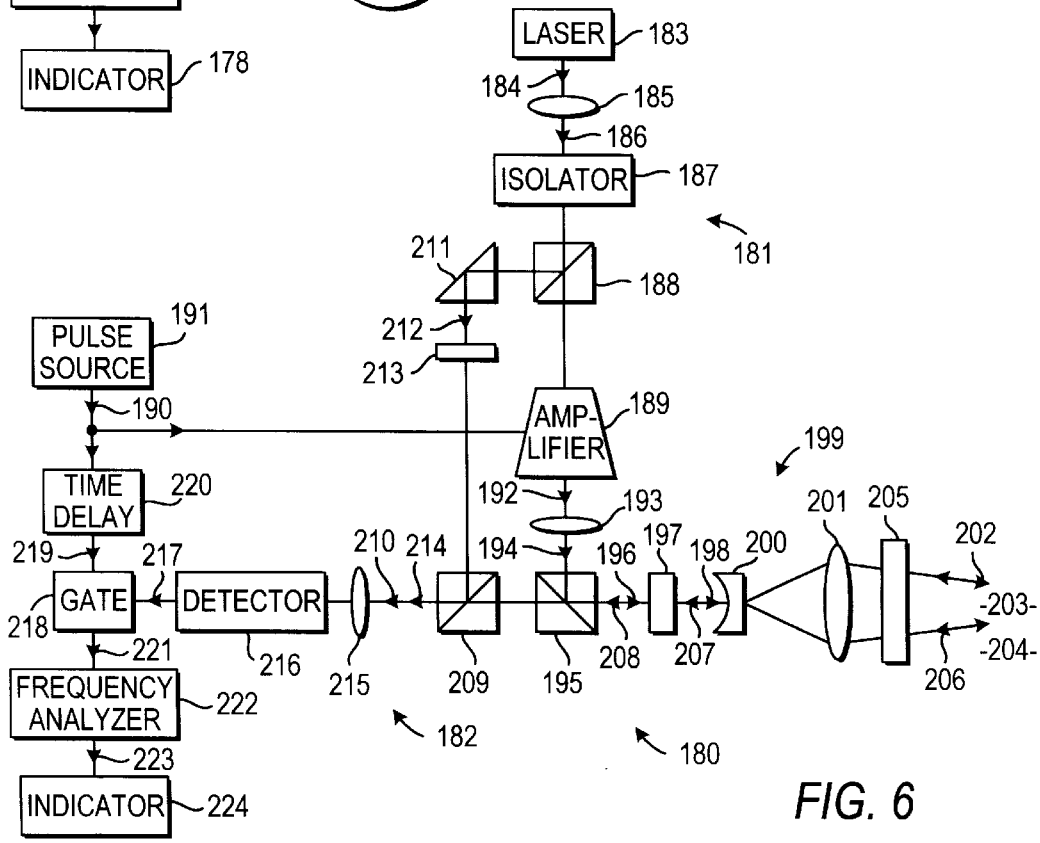
FIG. 6 shows a further embodiment of a remote air detector having a decreased sensitivity to solid objects.

FIG. 6 illustrates another technique for distinguishing between air back-scattered resultant signal and an unwanted signal from distant objects which comprises a detector 180 having a transmitter 181 and a receiver 182. The transmitter 181 comprises a laser source 183 which produces an elliptical cone of laser radiation 184 that is collimated by a collimator lens 185 into a parallel beam 186. An example of a suitable laser source 183 is a single-frequency laser diode which generates a continuous wave output of laser radiation 184. The parallel beam 186 passes through an optical isolator 187, is transmitted through a low reflectivity beam-splitter 188 and passes through an optical amplifier 189. The optical amplifier is driven by a pulse signal 190 generated by a pulse source 191. The optical amplifier 189 is switched between amplification and non-amplification states according to pulse signal 190. When the amplifier is in an amplification state the parallel beam 186 is amplified by a large factor to produce a pulsed beam 192. The optical amplifier 189 can be, for example, a tapered waveguide semiconductor amplifier which is suitably switched between states by the pulse signal 190.

The pulse beam 192 is collimated by a collimator lens 193 to formed pulsed parallel beam 194. The laser source 183 is orientated in such a way that the pulsed parallel beam 194 is linearly polarised in a plane substantially perpendicular to the direction of propagation of the beam 194. Substantially all of the power in beam 194 is reflected from a polarising beam-splitter 195 to form a reflected beam 196 which then passes through a quarter-wave plate 197 that converts the reflected beam 196 from a linearly polarised beam to a circularly polarised beam 198.

The circularly polarised beam 198 then passes through a telescope 199 comprising lenses 200 and 201 which are operably arranged to form and project an expanded light beam 202 having a diameter typically between ten and a hundred millimetres. The lenses 200, 201 are arranged to focus the light beam 202 onto a remote focal point 203 in the atmosphere 204 at a range of between one and one hundred and fifty metres from the lens 201. The expanded beam 202 can be arranged to pass through a plane parallel glass window 205 placed between lens 201 of the telescope 199 and the focal point 203 to allow the beam 202 to pass out of the body of an aircraft, not shown.

Optical amplifier 189 is repetitively switched by pulse signal 190 with a duration of, for example, one microsecond. The pulse duration should be sufficient to produce a pulse beam 192 having a frequency spectrum narrower than the frequency resolution required for measurement of air flow velocity at the remote focal point 203, but less than the propagation time to and from any solid object likely to be in the path of the expanded beam 202.

A small proportion of resultant light 206 is back-scattered from the focal point 203 by particles or aerosols in the air flowing through point 203 in a direction which returns to the receiver 182, and onto a detector, through window 205. The resultant light 206 is focussed by lenses 200, 201 into a substantially parallel beam 207 travelling in a direction opposite to that of the circularly polarised beam 198. The parallel beam 207 passes through the quarter-wave plate 197 where it is substantially converted from a circularly polarised beam to a linearly polarised beam 208 having a direction of polarisation parallel to the direction of propagation of beam 208. The beam 208 passes anattenuated through polarising beam-splitter 195 and then passes through a low reflectivity unpolarised beam-splitter 209 to form signal beam 210.

A small proportion of parallel beam 186 is reflected by beam-splitter 188 to a prism 211 to form a beam 212. The beam 212 is reflected by prism 211, where it passes through a half-wave plate 213 and into beam-splitter 209 where it is reflected to form reference beam 214. The half-wave plate 213 rotates the plane of polarisation of beam 212 through ninety degrees. Reference beam 214 is made parallel and collinear with signal beam 210 by adjustment of the position and orientation of prism 211.

Signal beam 210 and reference beam 214 are focussed by lens 215 onto a photodetector 216 where they interfere to create a resulting beam intensity modulated at the Doppler frequency created by the relevant movement of scattering particles at the focal point 203 to form a photocurrent 217 at the output of detector 216.

The photocurrent 217 is gated by gate 218 which is driven by a delay signal 219 generated by passing pulse signal 190 through a time delay circuit 220. The delay circuit 220 delays the pulse signal 190 by the time taken for light beam 201 to travel to focal point 203 and back to the photodetector 216. An output 221 from gate 218 is passed to a frequency analyser 222 which can be a fast Fourier transform analyser of a pulse-pair analyser. A result 223 from the frequency analyser 222 can then be passed to an indicator 224 which presents the Doppler frequency suitably scaled to indicate air flow velocity at the focal point 203.

Figure 7:
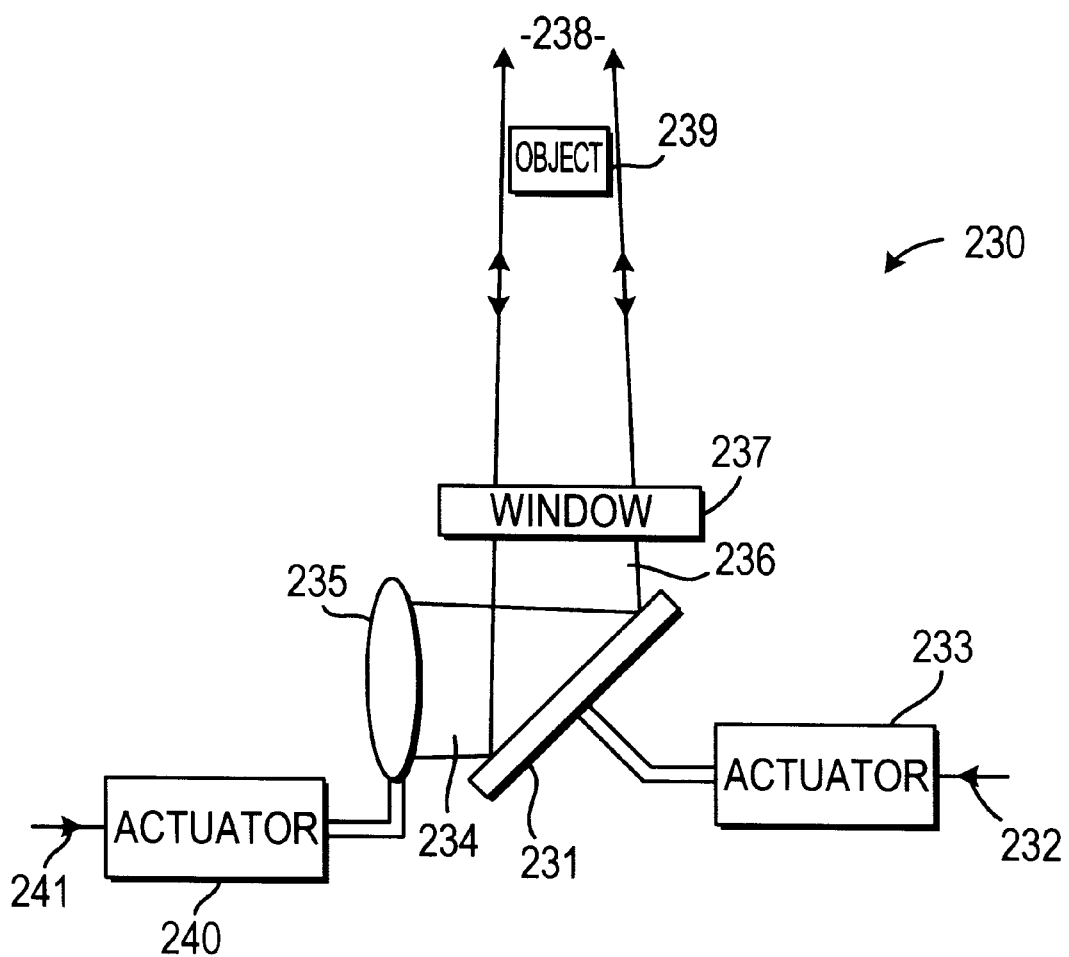
FIG. 7 shows a portion of apparatus for moving a beam emitted by a transmitter across an area ahead of an aircraft.

From FIG. 7, the light beams 54, 108, 157 and 202 explained respectively with reference to FIGS. 2, 3, 5 and 6 can be made to scan an area ahead of an aircraft. A scanner 230 comprises a plane mirror 231 which can be tilted in response to a control signal 232 applied to an actuator 233 operably connected to the mirror 231. The control signal 232 can be generated by a control means, not shown. Light 234 emerging from a final lens 235 of a telescope, not shown, but which has been described with reference to FIGS. 2, 3, 5 and 6, is reflected by mirror 231 to form reflected beam 236. The reflected beam 236 passes out of an aircraft, not shown, through a suitable plane parallel glass window 237 and is focussed on a remote focal point 238 at a distance comparable with the maximum distance at which objects in the path of the aircraft are to be detected.

An object 239 in the path of beam 236 scatters a proportion of incident light which returns through window 237, is reflected by scanning mirror 231 and passes through lens 235. A signal beam is detected in accordance with the procedures described with reference to FIGS. 2, 3, 5 and 6 giving the range and velocity of the object 239 relative to the aircraft carrying the detector.

The angular orientation of scanning mirror 231 is then changed by a small amount, causing reflected beam 236 to be projected in a new direction. The range of any object in the path of new beam 236 is determined as before. Mirror 231 is moved through a sequence of discrete angles by the signal 232 applied to the actuator 233 and the range of any objects in the path of beam 236 is recorded in each angular position. Signal 232, for example, can be programmed to cause the focal point 238 of beam 236 to execute a circle or a figure of eight, subtending an angle of, for example six degrees, at mirror 231, with a central axis aligned with the direction of forward motion of the aircraft. The range of any object such as a pylon, overhead wire or building in the path of beam 236 can then be detected, enabling a warning signal to be presented to a pilot of the aircraft.

The scanner 230 can be operated in rapid sequence by attaching lens 235 to an actuator 240 which rapidly moves lens 235 in an axial direction by a known amount in response to a drive signal 241 thereby focussing the light beam at different ranges from the lens 235. The control means can also be arranged to generate the signal 241 to move lens 235 to a first position, which can be a position which causes the focal point 238 of beam 236 to be approximately twenty metres from the aircraft. The control means also generates a signal 232 to move beam 236 in a first direction. The air velocity at the focal point can then be processed as previously described, the control means then generates a further signal 232 to move beam 236 to a second position substantially different to the first position and the air velocity is computed again. The control means then generates a third signal 232 to move beam 236 in a third direction substantially different to the first and second directions and a third measurement of air velocity is calculated. The three measurements of air velocity in three known beam directions, which can take approximately three hundred millisecond to complete, are used by a suitably arranged processor, not shown, to calculate the direction of air velocity vector relative to the aircraft axis by applying conventional vector transformations.

The control means then generates a signal 241 to move lens 235 to a second position at which the focal of beam 236 is at a maximum distance from the aircraft. The control means then sends a signal 232 causing beam 236 to rapidly move to a sequence of positions required for obstacle warning, taking a measurement of range to any obstacle in the path of the beam 236 in each position. Each range measurement can require less than one millisecond to complete. After a time of approximately seven hundred milliseconds, the control means generates a signal 241 to move lens 235 back to the first position and the measurement cycle is repeated. In this way repeated measurements of air velocity and the range and position of objects in the path of the aircraft are continuously made available with an information update time of approximately one second.

The lens 235 can be the final lens of a telescope used to project the beam, as previously described with referenced to FIGS. 2, 3, 5 and 6, or can be a separate lens 235 appropriately positioned after the telescope.

What is claimed is:

1. An arrangement for determining air flow direction and velocity of air remote from an aircraft in flight, comprising:
   a) a transmitter on the aircraft, for focusing and directing a primary light beam to a focal region remote from the aircraft, and for generating a secondary light beam from the primary beam;
   b) a receiver on the aircraft, for converting return light scattered by the air at the focal region into a scattered light beam; and
   c) a detector for determining the air flow direction and the velocity of the air at the focal region, including
      i) a beam-splitter for splitting the scattered beam into first and second signal beams, and for splitting the secondary beam into first and second reference beams,
      ii) a polarizer for polarizing the signal beams to differ in phase by ninety degrees, and
      iii) a detection circuit for processing the first signal beam and the first reference beam to produce a first electrical signal having a first phase, for separately processing the second signal beam and the second reference beam to produce a second electrical signal having a second phase, for combining the first and second signals to determine the air velocity, and for processing the first and second phases to determine the air flow direction.

2. The arrangement of claim 1, wherein the transmitter includes a laser source for producing the primary light beam with a linear polarization in a plane substantially perpendicular to a direction of propagation of the primary beam, and a first quarter-wave plate for converting the primary beam to have a circular polarization.

3. The arrangement of claim 2, wherein the transmitter further includes a telescope for expanding and directing the primary beam through a window on the aircraft.

4. The arrangement of claim 3, wherein the receiver is operative for receiving the return light entering through the window and passing through the telescope and the first quarter-wave plate, and for receiving the return light through a second quarter-wave plate to convert the scattered beam to have a circular polarization.

5. The arrangement of claim 4, wherein the beam-splitter is operative for splitting the scattered beam of circular polarization into the first and the second signal beams of equal amplitudes.

6. The arrangement of claim 5, wherein the transmitter includes an optical splitter for forming the secondary beam from the primary beam, and a half-wave plate through which the secondary beam passes.

7. The arrangement of claim 1, wherein the detection circuit includes a first photodetector for detecting interference between the first signal beam and the first reference beam to produce the first electrical signal as a first current signal, and a second photodetector for detecting interference between the second signal beam and the second reference beam to produce the second electrical signal as a second current signal.

8. The arrangement of claim 7, wherein the detection circuit includes means for comparing the first and second phases of the first and second current signals to determine one direction of the air flow when one of the phases leads the other of the phases, and to determine an opposite direction of the air flow when said one phase lags said other phase.

9. The arrangement of claim 8, wherein the comparing means includes a phasemeter and a phase indicator.

10. The arrangement of claim 7, wherein the detection circuit includes means for combining the first and second current signals to produce a combined signal, and a frequency analyzer for measuring a frequency characteristic of the combined signal.

11. The arrangement of claim 1, wherein the transmitter and the receiver have a common scanner for scanning an area ahead of the aircraft, the scanner including a generally planar mirror and a controller for moving the mirror to a plurality of angular positions.

12. The arrangement of claim 11, wherein the scanner includes a movable focusing lens, and a drive for moving the lens along a direction of propagation of the primary beam to focus the primary beam at different distances relative to the focusing lens.

13. The arrangement of claim 12, wherein the detection circuit is operative for determining the air flow direction at each of the distances.

14. The arrangement of claim 12, wherein the focusing lens is a component of a telescope for expanding and directing the primary beam through a window on the aircraft.

15. A method of determining air flow direction and velocity of air remote from an aircraft in flight, comprising the steps of:
   a) focusing and directing a primary light beam to a focal region remote from the aircraft, and generating a secondary light beam from the primary beam;
   b) converting return light scattered by the air at the focal region into a scattered light beam; and
   c) determining the air flow direction and the velocity of the air at the focal region, including
      i) splitting the scattered beam into first and second signal beams, and splitting the secondary beam into first and second reference beams,
      ii) polarizing the signal beams to differ in phase by ninety degrees, and
      iii) processing the first signal beam and the first reference beam to produce a first electrical signal having a first phase, separately processing the second signal beam and the second reference beam to produce a second electrical signal having a second phase, combining the first and second signals to determine the air velocity, and processing the first and second phases to determine the air flow direction.

16. The method of claim 15, wherein the determining step includes detecting interference between the first signal beam and the first reference beam to produce the first electrical signal as a first current signal, and detecting interference between the second signal beam and the second reference beam to produce the second electrical signal as a second current signal.

17. The method of claim 16, wherein the determining step includes comparing the first and second phases of the first and second current signals to determine one direction of the air flow when one of the phases leads the other of the phases, and to determine an opposite direction of the air flow when said one phase lags said other phase.

18. The method of claim 16, wherein the determining step includes combining the first and second current signals to produce a combined signal, and analyzing a frequency characteristic of the combined signal.

19. The method of claim 15, and further comprising the step of scanning an area ahead of the aircraft, by moving a generally planar mirror to a plurality of angular positions.

20. The method of claim 19, wherein the scanning step includes moving a movable focusing lens along a direction of propagation of the primary beam to focus the primary beam at different distances relative to the focusing lens.

* * * * *